United States Patent [19]
Liencres et al.

[11] Patent Number: 5,765,196
[45] Date of Patent: Jun. 9, 1998

[54] SYSTEM AND METHOD FOR SERVICING COPYBACK REQUESTS IN A MULTIPROCESSOR SYSTEM WITH A SHARED MEMORY

[75] Inventors: Bjorn O. Liencres, Palo Alto; Ashok Singhal, Redwood City; David J. Broniarczyk, Mountain View, all of Calif.

[73] Assignee: Sun Microsystems, Inc., Mountain View, Calif.

[21] Appl. No.: 607,364

[22] Filed: Feb. 27, 1996

[51] Int. Cl.⁶ .................................................. G06F 13/14
[52] U.S. Cl. .................. 711/143; 711/134; 711/147; 395/200.08
[58] Field of Search ........................... 395/461, 469, 395/470, 471, 460, 462, 468, 486, 200.08, 474

[56] References Cited

U.S. PATENT DOCUMENTS

| | | | |
|---|---|---|---|
| 5,530,933 | 6/1996 | Frink et al. | 395/468 |
| 5,581,729 | 12/1996 | Nishtala et al. | 395/471 |
| 5,644,753 | 7/1997 | Ebrahim et al. | 395/445 |

Primary Examiner—Glenn Gossage
Attorney, Agent, or Firm—Gary S. Williams; Flehr Hohbach Test Albritton & Herbert LLP

[57] ABSTRACT

In a multiprocessor system having a shared memory, each central processor services copyback requests from other central processors. Each central processor has a writeback buffer along with a plurality of tag buffers and an associated snoop architecture for processing writeback and copyback commands. Each central processor includes a cache subsystem having a system interface, a main cache and an associated tag array. The system interface has an address controller and data controller, each having separate input and output queues for interfacing between the central processor and system control and data buses. The address controller includes a set of duplicate tags that mirror the tags associated with the main cache, and an auxiliary tag input buffer and auxiliary tag output buffer. The address controller has for each line in the output queue an associated pointer that indicates the location in the data controller where data is stored that is associated with output queued commands. In operation, the address controller processes inbound multiple copyback requests without requiring the central processor to access data from its associated main cache. The address controller utilizes the output queues in the address and data controller as well as the auxiliary tag buffers to store copyback data and tag information.

11 Claims, 6 Drawing Sheets

SYSTEM AND METHOD FOR SERVICING COPYBACK REQUESTS IN A MULTIPROCESSOR SYSTEM WITH A SHARED MEMORY

The present invention relates generally to multi-processor computer systems in which the processors share memory resources, and particularly to a multi-processor computer system that utilizes a combined writeback and copyback buffer to improve copyback performance.

BACKGROUND OF THE INVENTION

Caches are used in many computer systems to improve performance. A cache is a storage area that is faster to access by a central processing unit (CPU) than main memory. In most caches, the first time an address is referenced by the CPU, the corresponding data is fetched from memory. Subsequent accesses to this data are fetched from the cache, not memory.

A cache is typically made up of one or more cache lines. Each cache line has an associated cache tag and cache flags. A cache tag indicates what address in main memory corresponds to a given cache line, and the flags indicate the state of the cache line.

Once a cache line is loaded, subsequent reads of that same address by a requesting processor can simply access the cache, as opposed to having to access main memory. In addition, data associated with the memory address may be updated numerous times. Depending on the type of cache, the "updated" data is subsequently or concurrently written to main memory.

In a writeback cache scheme, the updated value of the cache line is not sent to main memory until a cache replacement occurs. A cache replacement occurs when the CPU needs to access another memory location that is not in the cache, and accordingly, must free up a cache line to store the new data.

A cache controller identifies the cache line that is to be used for the new data. This identification process often is dependent on last use, but other replacement schemes may be used. The CPU will look at the flags associated with the cache line being replaced and determine if the cache line was previously updated. If the cache line was previously updated, the "new" data must be saved to main memory in order to preserve the updates. If the cache line being replaced has not been updated, then no update of main memory is required.

The subsequent memory update to main memory of the data stored in the replaced cache line is called a writeback. In the prior art, writebacks have been implemented by either performing the writeback prior to the replacement of the cache line with the new data or alternatively, by using a writeback buffer. The writeback buffer is a special buffer that holds the updated data from the cache line being replaced, so that the cache line is free to accept the new data when it arrives and takes its place in the cache. Accordingly, the "new" data can be returned sooner, since the overhead associated with processing the writeback is able to be delayed until after the request for new data is serviced.

In addition to a writeback buffer, not only must the data associated with the replaced cache line be temporarily stored, so must the cache tag and flags associated with the updated data. This is because the new data requires it's own address (tag) and status (flag) information. In a typical writeback buffer implementation, the separate address and status information is stored in either a separate register or in a tag array for the cache.

As mentioned above, a writeback cache can have data that has been updated by a processor, whereas the corresponding main memory location has not yet been updated. If another cache in the multi-processor system wishes to access that same location, its cache needs the updated data. In a multi-processor system, a copyback is the operation that allows one cache to supply data to another requesting cache.

In the prior art, copybacks are performed by having the requesting cache provide a request to the cache that owns the updated data. The processor associated with the cache that owns the updated data services the copyback request and provides the data on the system data bus to the requesting cache. However, in the prior art, the processor servicing the copyback request was unable to access its own cache during the service process, and accordingly slowed performance for the servicing processor.

In a multi-processor computer system, this problem can be further exasperated when multiple processors request or contend for information that is owned by a cache associated with a single processor. For example, when a software semaphore requires that multiple processors contend for access to the same memory location at the same time, the memory location will be cached by the first processor accessing the data. The reason this case is very common is because several processors will be accessing a semaphore lock in a loop. All these processors will have the semaphore cached. When one processor updates the semaphore to release the lock, all the other cached copies of the semaphore become invalid, and therefore all the other processors will issue reads to the one processor that performed the update.

In a conventional multi-processor system, the processor that owns the data will receive one request from each of the other processors in the multi-processor system that are attempting to access the same memory location. The cache associated with the processor that owns the data is required to service each of these copyback requests received from the other processors in the system. Accordingly, the cache that owns the data is unable to service its own processor's cache memory requests.

It is therefore an object of the present invention to utilize a buffer during the copyback operation to improve copyback performance in a multi-processor computer system.

SUMMARY OF THE INVENTION

In summary, the present invention is a method and apparatus for improving the copyback performance in a multi-processor computing system by utilizing a buffer along with a plurality of tag buffers and an associated snoop architecture for processing writeback and copyback commands at the cache subsystem. Each central processor is connected via system address and control buses to a main memory and a system controller. Associated with each central processor is a cache subsystem that includes a system interface, a main cache and an associated tag array.

The system interface has an address controller and data controller, each having separate input and output queues for interfacing between the central processing unit and system control and data buses used in the multi-processor computing system. The address controller also includes a set of duplicate tags that mirror the tags associated with the main cache, and an auxiliary tag input buffer and auxiliary tag output buffer. The address controller has for each line in the output queue an associated pointer that indicates the location in the data controller where data is stored that is associated with those output queued commands that transfer data. In a preferred embodiment a writeback buffer is utilized to service the multiple copyback requests. Upon a read miss, the auxiliary tag input buffer is loaded with tag information associated with the cache line that is being replaced, and is subsequently cleared upon the issuance of the writeback from the output queue to the system control bus. The auxiliary tag output buffer is loaded upon issuance of a copyback reply or writeback request by the processor to the address controller. The auxiliary tag output buffer contains address information as well as flags associated with whether the tag indicates writeback or copyback. In operation, the address controller processes multiple inbound copyback requests without requiring the central processor to access the data from its associated main cache. The address controller utilizes the output queues in the address and data controller as well as the auxiliary tag buffers to store copyback data and tag information.

BRIEF DESCRIPTION OF THE DRAWINGS

Additional objects and features of the invention will be more readily apparent from the following detailed description and appended claims when taken in conjunction with the drawings in which:

DESCRIPTION OF THE PREFERRED EMBODIMENT

Figure 1:
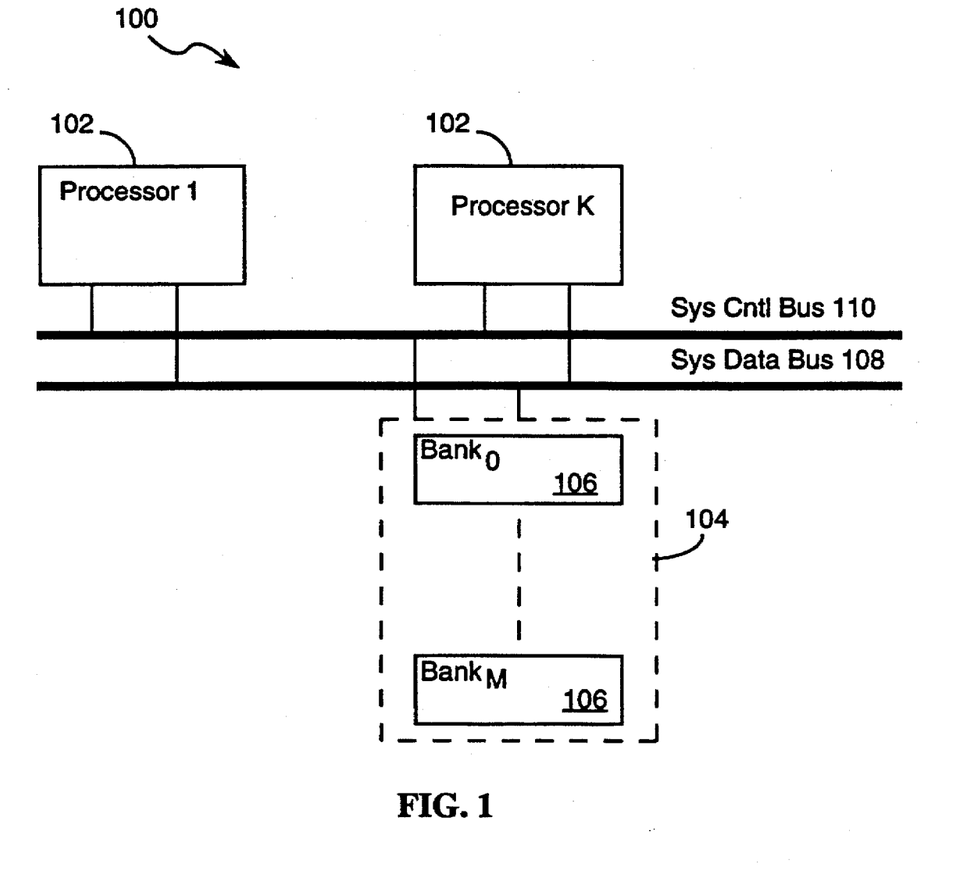
FIG. 1 is a diagram of a multi-processor computing system according to the present invention.

Referring to FIG. 1, there is shown a multi-processor computer system 100 incorporating the cache architecture of the present invention. The multi-processor computer system 100 includes a plurality of processors 102, a main memory 104 that may be divided into multiple memory banks 106, system data bus 108 and system control bus 110. System data bus 108 and system control bus 110 interconnect the processors 102 to main memory 104. The system control bus 110 routes address and control information to the processors 102. In addition, the system control bus 110 routes address information between the processors and the main memory 104. The system data bus 110 provides a data path between the processors 102 and main memory 104. Each of the system buses (108 and 110) operate independently.

Figure 2:
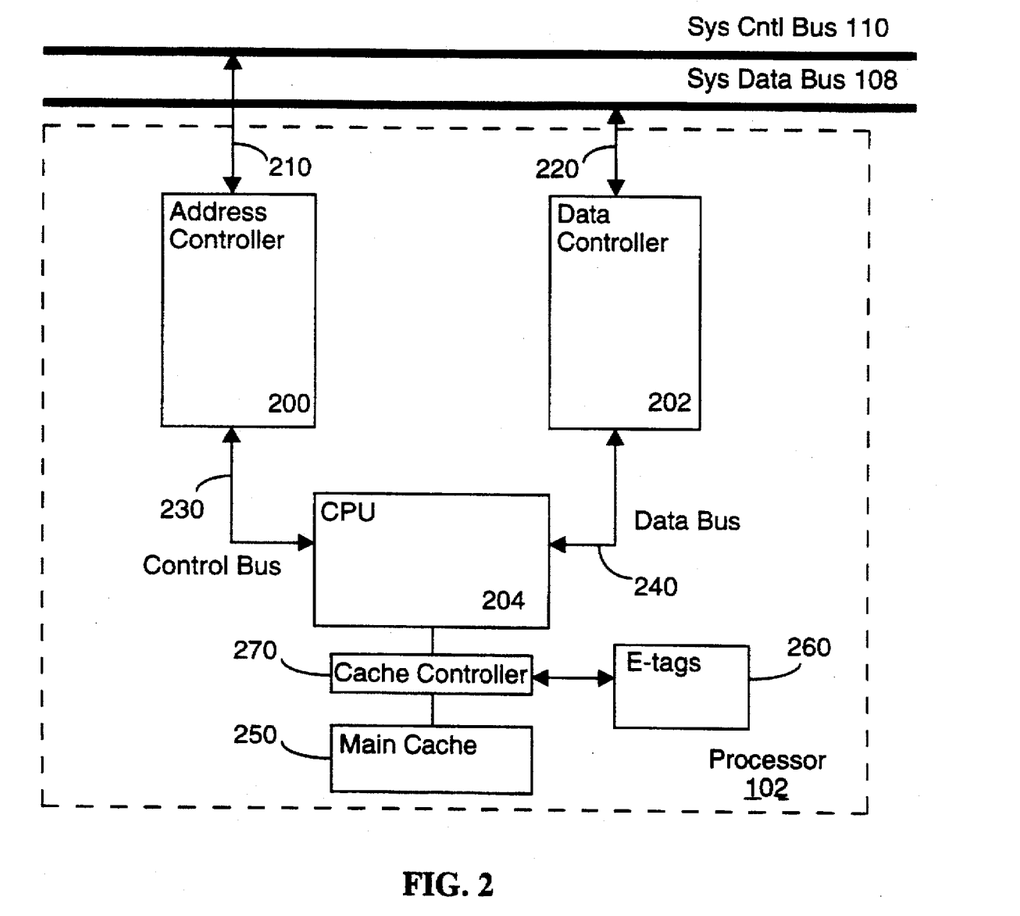
FIG. 2 is a block diagram of an individual processor in the multi-processor computing system of FIG. 1.

Referring to FIG. 2, the architecture for a processor according to the preferred embodiment of the present invention is shown. Processor 102 includes an address controller 200, data controller 202, and central processing unit (CPU) 204. The address controller 200 is connected via a bi-directional control bus 210 to the system control bus 110 so as to allow for the transfer of CPU command and control information between the CPU and other system resources. The data controller 202 is connected by a bi-directional bus 220 to the system data bus 108 to allow for the transmission of data into or out of the processor 102.

The address controller is connected to the CPU 204 by a control data bus 230 that allows for the bi-directional flow of control signals between the address controller 200 and the CPU 204. Similarly, the data controller 202 is connected to the CPU by a bi-directional data bus 240.

Finally, the central processor unit is coupled to a main cache memory 250 via a cache controller 270. The main cache memory 250 includes a plurality of cache lines for storing of data. In the preferred embodiment, the main cache memory 250 is a writeback cache that will generate a writeback command for dirty data stored in a victimized cache line. The main cache memory 250 has associated with it a set of E-tags that are stored in an array 260. The E-tags contain information including the address and status of each entry in the main cache memory 250.

Figure 3:
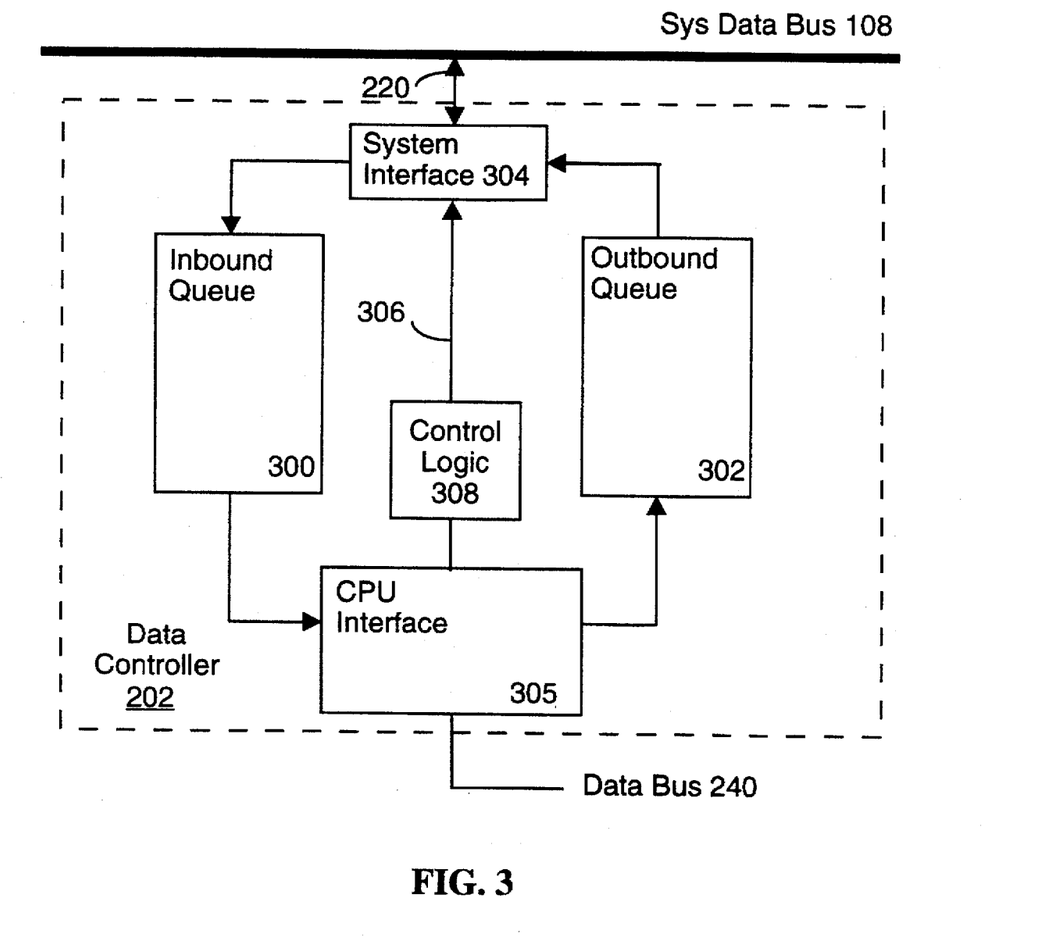
FIG. 3 is a block diagram of the data controller shown in FIG. 2.

Referring now to FIG. 3, a block diagram of a data controller 202 according to the preferred embodiment of the present invention is shown. Data controller 202 includes an inbound queue or buffer 300 and an outbound queue or buffer 302. The inbound buffer 300 receives data to be read by the CPU as part of various read and other data transfer operations. In this embodiment, the inbound buffer is sized as eight cache lines each of which holds 64 bytes of data.

The outbound data buffer 302 is utilized to hold noncoherent, non-cached and I/O address spaced write data as well as writeback and copyback data for transmission to main memory or other processors in the multi-processor system. In the preferred embodiment, the outbound buffer 302 is eight cache lines in size, with each cache line holding 64 bytes.

System Interface 304 connects the bi-directional data bus 220 to the inbound and outbound queues 300 and 302 for transfer of data between the data controller 202 and other elements in the multi-processor computer system. CPU Interface 305 connects the data bus 240 to the inbound and outbound queues 300 and 302 for transfer of data between the data controller 202 and the CPU 204. In addition, the data controller includes a bypass bus 306 and a control logic 308 for allowing the direct transmission of data from the data bus 240 to the system data bus 108.

Figure 4:
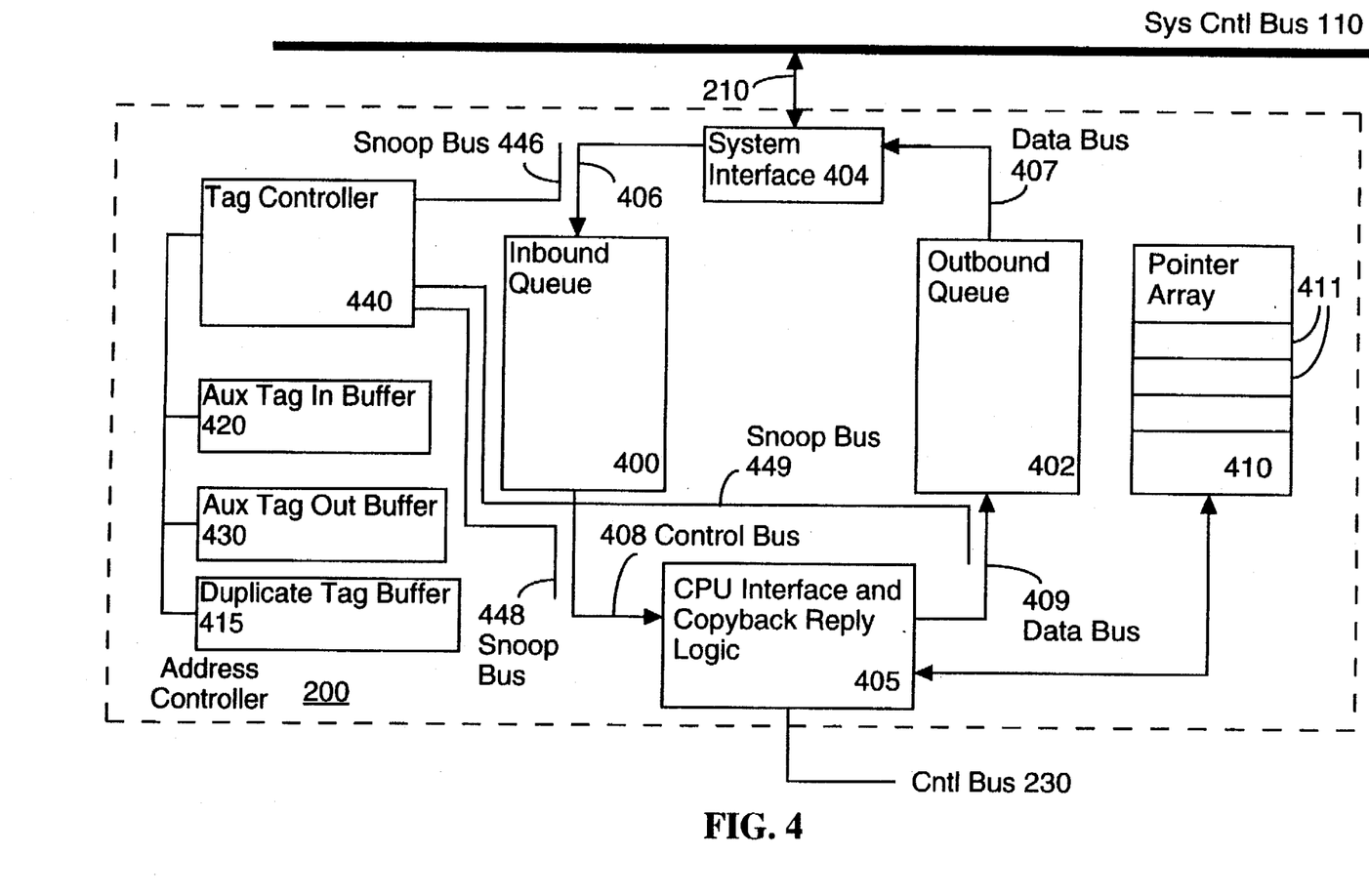
FIG. 4 is a block diagram of the address controller shown in FIG. 2.

Referring now to FIG. 4, an address controller according to one embodiment of the present invention is shown. Address controller 200 includes an inbound queue 400, outbound queue 402, system interface 404 and CPU interface 405. System interface 404 is connected to the bi-directional control bus 210 allowing for transfer of address and control information between the address controller 200 and other elements in the multi-processor computer system. CPU interface 405 is connected to the control data bus 230 to allow for the transfer of address and control information between the address controller 200 and the CPU 204.

The inbound queue 400 is connected to the system interface 404 and to the CPU interface by control busses 406 and 408. Similarly, the outbound queue 402 is connected to the system interface 404 and the CPU interface 405 by data buses 407 and 409. In the preferred embodiment, the inbound queue 400 is sized 64 lines deep. In the preferred embodiment, the outbound queue is sized 18 lines deep. The outbound queue 402 is sized larger than the outbound buffer in the data controller 202 because not all command and control signals issued from the processor have an associated data block that needs to be stored in the data controller 202.

The address controller 200 also includes a pointer array 410. The pointer array 410 includes a plurality of pointers 411 that indicate a location in the data controller 202 associated with each respective command stored in the inbound and outbound queues of the address controller.

The address controller 200 further includes a duplicate tag (D-tag) buffer 415, an auxiliary tag input buffer 420, an auxiliary tag output buffer 430 and a tag controller 440. Connected to the tag controller 440 are three snoop buses 446, 448 and 449 for allowing the tag controller to snoop on data buses 406, 408 and 409 respectively. The duplicate tag buffer 415 contains duplicate tag information and mirrors the E-tag information associated with the main cache 250. The functions of the duplicate tags and the snoop buses will be described in greater detail below.

The auxiliary tag input buffer 420 stores tag information for writeback data. Similarly, the auxiliary tag output buffer 430 stores tag information associated with a writeback or copyback data. In the preferred embodiment, buffers 420 and 430 are sized to store a single tag each, but in alternate embodiments larger versions of buffers 420 and 430 could be used.

Figure 5:
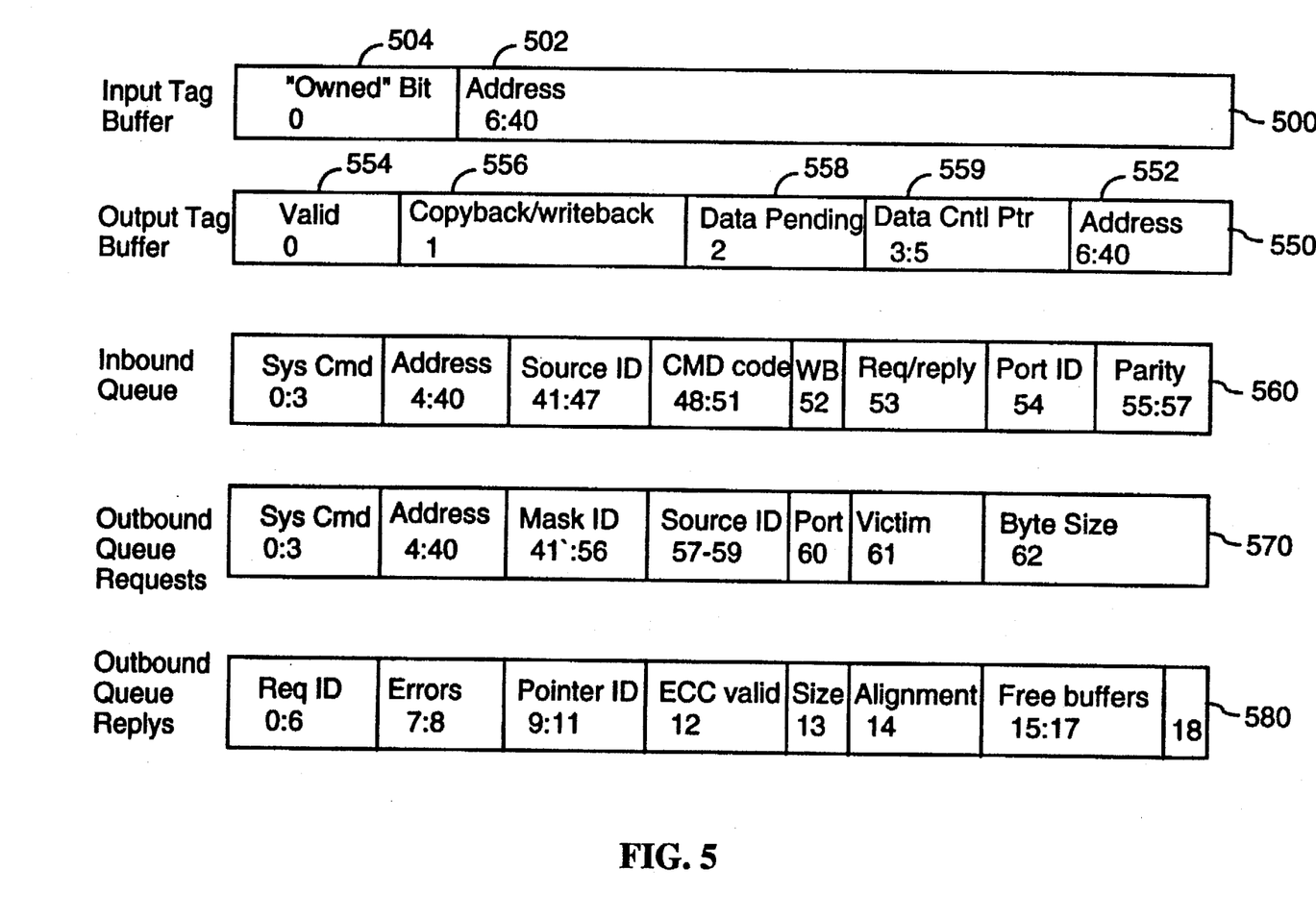
FIG. 5 shows the format of the tags and queued commands used in conjunction with one embodiment of the present invention.

Referring to FIG. 5, the format of the data to be stored in the auxiliary tag input and output buffers is shown. An auxiliary input tag 500 includes address bits [40:6] 502 and an "owned" bit 504 indicating that the address is valid and is for a dirty cache line that is to be written back. An auxiliary output tag 550 includes address bits [40:6] 552, valid bit 554, copyback/writeback bit 556, data pending bit 558 and data controller pointer 559. The valid bit indicates a valid address. The copyback/writeback bit 556 indicates if the data must be written back or whether it is only for a previous copyback. The data pending bit 558 indicates whether the data has arrived from the CPU yet. Finally, the data control pointer 559 tells what buffer the data is located in for the copybacks.

FIG. 5 also shows the format for inbound commands 560 and outbound requests 570 and replies 580 as stored in the outbound queue of the address controller. The function of the auxiliary tag input buffer and auxiliary tag output buffer as well as the outbound commands will be described in greater detail below in conjunction with the writeback and copyback operation.

Writeback Operation

A writeback operation may be initiated upon a cache miss. Referring to FIGS. 2 and 4, a read miss occurs when a read request is made by the CPU 204 and the main cache 250 does not contain the information associated with the read request. The cache controller 270 determines the cache line in the main cache 250 that is to be victimized and issues a writeback request if the victimized cache line contains dirty data. Data is dirty in a cache line when it has been updated since arrival in the cache and has not been written back to the main memory.

When a read miss occurs, the processor issues a read request transmitting address information via the control data bus 230 to the address controller 200 indicating the address associated with the data desired to be read. The cache controller 270 initiates its replacement algorithm to determine which cache line in the main cache 250 will be allocated for the data associated with the read request. In the event the previous cache line state is dirty, then a writeback request is initiated. In the event the previous cache line state is clean, the tag is set to Invalid and the cache line is free to be written to upon the arrival of the new data and associated tag information.

Upon receipt of the read request from the CPU 204 by the address controller 200, the CPU interface 405 transfers the read request to the outbound queue 402. The read request works its way to the top of the outbound queue and is issued to the system as a memory request to main memory. The tag controller 440 snoops the read tag data on the control bus 406 associated with the inbound read request. The tag controller 440 snoops the read tag data on the data bus 406 associated with the inbound request. The tag controller 440 determines if the cache line is dirty and if so loads its associated tag information into the auxiliary tag input buffer 420.

At some point, the processor 204 will issue a writeback command via the control bus 230 to the address controller 200. The address controller 200 processes the writeback request from the CPU, loading the request into the outbound queue 402. The address controller evaluates the pointers in the pointer array 410 to determine a next location available in the outbound queue of the data controller 202. Subsequently, a pointer 411 in the pointer array 410 will be designated to indicate the location in the data controller outbound queue that contains the writeback data. During the transfer of the writeback request to outbound queue 402 from the CPU interface 405, the tag controller 440 snoops via the snoop bus 449 on the data bus 409 and loads the auxiliary output tag buffer 430 with tag information associated with the writeback request. When the writeback request is issued and passes to the system bus, the auxiliary tag input buffer 420 and auxiliary tag output buffer 430 are cleared completing the writeback operation.

Copyback Operation

A copyback operation occurs when the main cache 250 for a given processor 204 contains data that has been updated, and has not been written back to main memory. The copyback occurs when another processor in the multi-processor computing system requests the data from the processor that "owns" the data in its associated cache. The copyback request is received on the system control bus 110 and is then asserted on data bus 406 for evaluation and possible storage in inbound queue 400. The tag controller 440 snoops the data bus 406 via snoop bus 446 when the received copyback request is first asserted on data bus 406.

The tag controller evaluates each received read request to determine if the memory location requested is the same as the memory location stored in the auxiliary tag input buffer 420 or if the memory location is stored in the D-tags 415. As was described above, the auxiliary tag input buffer 420 stores an address associated with writeback data or copyback data that has yet to be processed by the address controller.

If a match occurs between the address information in the received copyback request and any D-tag in the D-tag array 415, or a match occurs with the auxiliary tag input buffer 420, the received copyback request is stored in the inbound queue 400 because the requested data is located in this processor's main cache 250 or in the data controller's output queue 302. The copyback request will work its way through the inbound queue 400, eventually to be issued to the CPU interface 405.

Copyback requests placed in the inbound queue eventually reach the top of the queue and are passed to the CPU interface 405. In the preferred embodiment, the tag controller 440 snoops on the data bus 408 via the snoop bus 448 to see if the address associated with the copyback request at the top of the inbound queue 400 is the same as the address information stored in the auxiliary tag output buffer 430 prior to issuance of the copyback request to the CPU 204. If the address information is the same, then the CPU 204 has already issued a writeback or a copyback for processing by the address controller for the same memory location. Accordingly, the data associated with the copyback (which is the same data associated with a prior writeback or copyback command issued by the processor 204) is resident in a portion of the outbound queue of the data controller 202. The CPU interface's logic therefore generates a copyback reply, without processing by the central processor, and stores the copyback reply in the outbound queue 402. The generated copyback reply references a same location in the data controller that contains data associated with the prior writeback or copyback.

If the tag controller 440 determines in it's snoop operation that the address of the received copyback command and the auxiliary tag output buffer 430 contain dissimilar address information, then the copyback request will be processed by the CPU 204 and the processor will issue the data associated with the copyback request as a copyback reply.

The CPU 204 services the copyback request by issuing a copyback reply command to the address controller 200 via the CPU interface 405. The address controller 200 processes the copyback reply, loading the reply into the outbound queue 402, and indicates to the CPU a location in the data controller to store the data associated with the copyback reply. The address controller 200 evaluates the pointers in the pointer array 410 to determine a next location available in the outbound queue of the data controller 202. Subsequently, a pointer 411 in the pointer array 410 will be designated to indicate the location in the data controller outbound queue that contains the copyback data. During the transfer of the copyback reply to outbound queue 402 from the CPU interface 405, the tag controller 440 snoops via the snoop bus 449 on the control bus 409 and loads the auxiliary output tag buffer with tag information associated with the copyback reply. When the copyback reply reaches the top of the outbound queue, it is issued and passes to the system bus.

When the copyback reply is issued, the auxiliary tag output buffer 430 that contains data associated with the copyback request memory location is not cleared. Similarly, the location in the data controller associated with the copyback address is also maintained. This allows for the subsequent transfer of multiple copyback commands to be serviced by the address controller without requiring service by the processor or its main cache. The auxiliary tag output buffer 430 is eventually overwritten with new values upon the issuance of another copyback request to a different memory location, or a subsequent writeback request.

Copyback During the Writeback Process

As was described previously, a copyback request will be received by the address controller 200 via the system control bus 110. The tag controller 440 will snoop on the data bus 406 to determine if the address associated with the copyback is present in the auxiliary tag input buffer 420. If the address is present in the auxiliary tag input buffer 420, then a read request has been issued by the processor 204 as part of a read miss operation. However, the writeback of dirty data from the processor has yet to occur. Accordingly, the address controller will process the copyback command and transfer it into the input queue 400. Upon reaching the top of the input queue 400, the tag controller will snoop the data bus 408 to check for the presence in the auxiliary tag output buffer 430 of the address associated with the copyback command.

If the snoop of the tag controller of the data stored in the auxiliary tag output buffer 430 determines that the address of the copyback request being transferred from the input queue to the CPU 204 is the same, then either a writeback or a copyback reply has been issued to the same memory location. If the tag in the auxiliary tag output buffer 430 indicates a copyback reply, then the address controller (using logic in the CPU interface 405) generates the corresponding copyback reply for the same memory location. The corresponding copyback reply will be issued to the outbound queue 402, and indicates a pointer that points to the location of the data in the data controller 202 corresponding to the copyback request.

If the tag in the auxiliary tag output buffer 430 indicates a writeback, then the address controller will generate a copyback reply associated with the copyback request utilizing the data stored in the data controller that is associated with the writeback request. Alternatively, the address controller may convert the writeback to a copyback reply with the same associated data, and transfer ownership of the data to the requesting CPU. In this alternative embodiment, no writeback is thereafter required to be performed and ownership will transfer to the requesting CPU.

Figure 6:
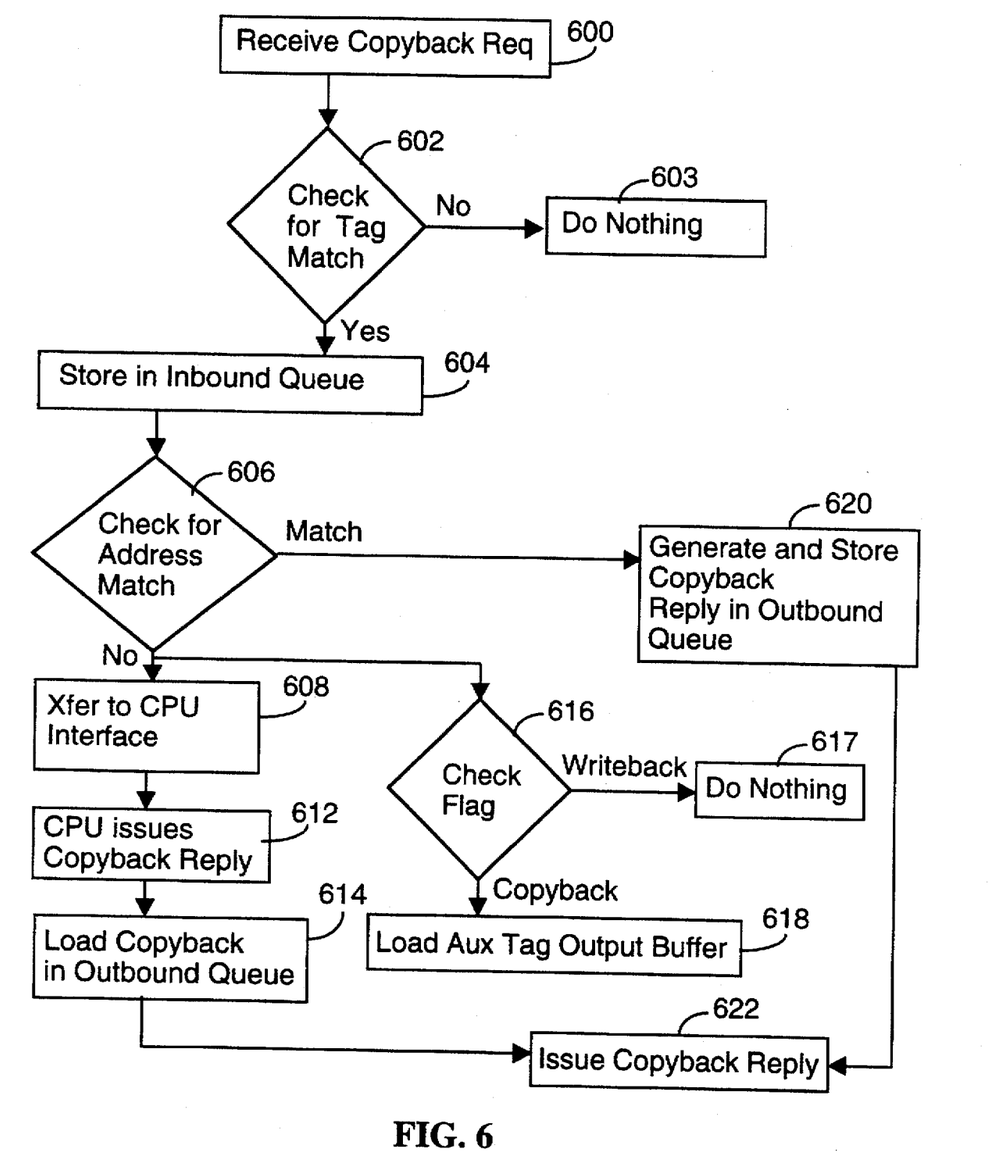
FIG. 6 is a flow chart of a copyback operation in accordance with one embodiment of the present invention.

Referring now to FIG. 6, a flow chart associated with a copyback operation according to the preferred embodiment of the present invention is shown. A copy back request is received by the address controller (step 600). The tag controller checks the auxiliary tag input buffer and the D-tags for a match (step 602). If a match is detected, then the copyback request is stored in the inbound queue (step 604). If no match is detected, then no action is taken.

When the copyback request reaches the top of the inbound queue, the tag controller checks to see if the address associated with the copyback request matches the address stored in the auxiliary tag output buffer (step 606). If a match is found, then a copyback reply is generated and stored (by the CPU interface 405) in the outbound queue indicating the same data as the data for the outbound queue item associated with the auxiliary tag output buffer (step 620). The same copyback reply is generated and stored in the outbound queue regardless of whether the auxiliary tag output buffer's flag 556 (FIG. 5) indicates a pending writeback or copyback operation.

If the comparison of the copyback address with the auxiliary tag output buffer does not find a match, the request is transferred to the CPU interface for transmission to the CPU (step 608). The CPU processes the copyback request and issues a copyback reply (step 612) that is then loaded in the outbound queue 402 by the CPU interface 405 (step 614).

In addition, and independently, the copyback/writeback flag 556 (FIG. 5) in the auxiliary tag output buffer 430 is checked to determine if the information stored therein is associated with a writeback or copyback reply (step 616). If the flag indicates writeback, then no action is taken with respect to the auxiliary tag output buffer (step 617). If the flag indicates a copyback reply, then the contents of the auxiliary tag output buffer are replaced with the tag data (address plus associated flags) for the current copyback request.

Copyback replies stored in the outbound queue 402 eventually work their way to the top of the outbound queue and are then issued to the system (step 622).

In the preferred embodiment, writebacks have precedence in the use of the auxiliary tag output buffer and data buffers over copybacks. Accordingly, any writeback issued by a processor will cause the auxiliary tag output and input buffers to be loaded and cleared as set out above, without regard for any copyback operation. In the worst case, a copyback will be required to be processed by the processor if the auxiliary buffers are busy.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A processor system for improving copyback performance in a multi-processor computer system having a shared main memory, said processor system comprising:
   a central processor;
   a writeback cache memory coupled to said central processor for storing data;
   a data controller coupled to said central processor for transferring data between said central processor and a system data bus of said multi-processor computer system; and
   an address controller coupled to said central processor for transferring address and control information between said central processor and a system control bus of said multi-processor computer system, said address controller including
   an input queue for receiving and storing inbound address and command information;
   an output queue for storing and issuing outbound address and command information;
   an auxiliary tag output buffer for storing address and status information associated with copyback and writeback operations pending in said output queue;
   a tag controller for determining if a match occurs between address information stored in said auxiliary tag output buffer and memory address information associated with an inbound copyback request received by said input queue; and
   logic for generating a copyback reply without accessing said writeback cache memory upon determination of a match of address information by said tag controller, said logic generating said copyback reply and placing said copyback reply in said output queue for issuance to another processor system of said multi-processor system.

2. The system of claim 1 wherein said tag controller determines if a match exists between the address information stored in said auxiliary tag output buffer and the memory address information associated with said inbound copyback request when said inbound copyback request reaches the top of the input queue of said address controller.

3. The system of claim 1 wherein said data controller includes an output queue for storing data associated with commands stored in said output queue of said address controller.

4. The system of claim 3 wherein said address controller further includes pointers that indicate locations in the output queue of said data controller that contain data associated with data transfer commands stored in said output queue of said address controller; and said tag controller determines, using said pointers, a location in said data controller containing data associated with said inbound copyback request.

5. The system of claim 3 wherein the output queue of said address controller is sized larger than the output queue of said data controller.

6. A method of servicing a copyback request by a processor connected in a multi-processor computer system having a shared memory, said processor including a data controller and an address controller for transferring data, and address and command information, respectively, between a central processor and buses of said multi-processor computer system, the method comprising the steps of:
   (a) loading an auxiliary tag output buffer with address information associated with writeback and copyback operations;
   (b) receiving a copyback request by said address controller;
   (c) checking the address information loaded in said auxiliary tag output buffer for a match with address information associated with the copyback request received by said address controller;
   (d) if no match is detected, processing the copyback request received by said address controller by said central processor; and
   (e) if a match is detected then
      (e1) generating, without processing by said central processor, a copyback reply by said address controller; and
      (e2) storing said copyback reply in an outbound queue of said address controller for issuance to another processor of said multi-processor computer system.

7. The method of claim 6 wherein
   said step (b) includes loading said copyback request received by said address controller into a queue of inbound data requests for processing by said central processor; and
   said step (c) is performed upon said copyback request received by said address controller reaching a top of said queue of inbound data requests.

8. The method of claim 6, further including the step of:
   (f) storing in a plurality of locations in said data controller, data, being transferred between said central processor and buses of said multi-processor computer system;
   wherein said step (a) includes setting a flag in said auxiliary tag output buffer if address information loaded therein is associated with a first copyback reply; and
   step (e) further includes:
      determining prior to step (e2) if said auxiliary tag output buffer flag is set indicating an associated copyback operation; and
      if the flag is set, generating a second copyback reply indicating the same location in said data controller that contains data associated with said first copyback reply.

9. A method of servicing a copyback request by a processor connected in a multi-processor computer system having a shared memory, said processor including a data controller and an address controller for transferring data, and address and command information, respectively, between a central processor and buses of said multi-processor computer system, the method comprising the steps of:
   (a) loading an auxiliary tag output buffer with address information associated with writeback and copyback operations, said loading step performed when copyback replies and writeback requests are generated by said central processor prior to issuance to buses of said multi-processor computer system;
   (b) storing in a plurality of locations in said data controller data being transferred between said central processor and a system data bus of said multi-processor computer system;
   (c) receiving a copyback request by said address controller;
   (d) checking the address information loaded in said auxiliary tag output buffer for a match with address information associated with the copyback request received by said address controller;
   (e) if no match is detected, processing the copyback request received by said address controller by said central processor; and
   (f) if a match is detected then (f1) determining a location in said data controller containing data associated with said copyback request received by said address controller;

(f2) generating, without processing by said central processor, a copyback reply by said address controller; and (f3) storing said copyback reply generated by said address controller in an outbound queue of said address controller for issuance to another processor of said multi-processor computer system.

10. The method of claim 9 wherein said step (c) includes loading said copyback request received by said address controller into a queue of inbound data requests for processing by said central processor; and said step (d) is performed upon said copyback request received by said address controller reaching a top of said queue of inbound data requests.

11. The method of claim 9 wherein:

said step (a) includes setting a flag in said auxiliary tag output buffer if address information loaded therein is associated with a writeback operation; and said step (e) includes determining if said auxiliary tag output buffer flag is set, indicating an associated writeback operation, and if the flag is not set, loading said auxiliary tag output buffer with the address information associated with said copyback request received by said address controller.

* * * * *